United States Patent [19]

Möder

[11] 4,167,163
[45] Sep. 11, 1979

[54] SENSOR MONITORING APPARATUS

[75] Inventor: Helmut Möder, Stuttgart, Fed. Rep. of Germany

[73] Assignee: Robert Bosch GmbH, Stuttgart, Fed. Rep. of Germany

[21] Appl. No.: 780,748

[22] Filed: Mar. 24, 1977

[30] Foreign Application Priority Data

Mar. 26, 1976 [DE] Fed. Rep. of Germany ....... 2612915

[51] Int. Cl.² ...................... F02M 7/00; G01N 31/00
[52] U.S. Cl. .................................. 123/119 EC; 73/23; 123/32 EE; 204/195 S
[58] Field of Search ...................... 60/276, 285; 73/23, 73/27 R; 123/32 EE, 32 EK, 119 EC; 204/195 S

[56] References Cited
U.S. PATENT DOCUMENTS

| 4,094,186 | 6/1978 | Wessel | 73/23 |
| 4,112,893 | 9/1978 | Anzai | 73/23 |
| 4,121,548 | 10/1978 | Hattori et al. | 73/23 |
| 4,127,024 | 11/1978 | Bertone | 73/27 R |

Primary Examiner—Samuel W. Engle
Assistant Examiner—S. A. Cangialosi
Attorney, Agent, or Firm—Edwin E. Greigg

[57] ABSTRACT

A sensor which determines an operational variable of a system, for example an oxygen sensor of an internal combustion engine, generates a usable output voltage only at the proper elevated temperature. In order to uncouple the control loop from an improperly operating sensor, i.e., a cold sensor, the internal resistance of the sensor is monitored by passing through it a test current and by comparing the resulting voltage drop to a set-point value. Whenever the internal resistance is too high, indicating non-readiness, the control loop is opened and a substitute average output value is supplied to the fuel injection system or to the system driven by the control loop. During normal operation, the sensor is tested periodically with short test pulses to continuously monitor the operational readiness, but the main test current is normally shut off, thereby preventing falsification of the output signal.

14 Claims, 3 Drawing Figures

SENSOR MONITORING APPARATUS

BACKGROUND OF THE INVENTION

The invention relates to a method and an apparatus for determining the operational status of a sensor and for engaging the control system of the fuel injection mechanism of the engine. It is known that a particular sensor which determines the oxygen content in the exhaust gas requires sufficient time to be brought to the proper operating temperature and that this period of time is not always the same. The output signals from the sensor which is located in the exhaust gas system affects the function of the fuel injection system, for example by adjusting the duration of the fuel injection control pulses or by engaging the supply of secondary air to the exhaust system.

For monitoring the operational status of an internal combustion engine, it is known for example to use a so-called oxygen sensor or λ-sensor to control the secondary air supply or to directly affect the mixture preparation of the engine. The oxygen sensor is located within the exhaust channel of the engine and, when properly warmed up, provides a signal which contains information regarding the composition of the exhaust gases and hence also of the original fuel-air mixture supplied to the engine. The output voltage of the λ-sensor is similar to a step function and has its maximum slope approximately in the vicinity of the point where the air factor λ is equal to 1. When the oxygen sensor is operating normally, a voltage $U_S$ which is kept constant may be used as a threshold voltage that is compared with the sensor voltage and, depending on which is larger, permits a conclusion as to the original composition of the mixture and its air factor λ. The signal derived from this comparison may be used for further fuel control, as well as for the above-mentioned supply of secondary air and the output signal from the λ-sensor then becomes an actual value which is used in a feedback control loop that includes the engine itself as the controlled variable. During the operation of the control loop, the set point value is altered continuously in accordance with the requirements of the engine.

One difficulty deriving from the operation of the λ-sensor is that it cannot provide information regarding the state of the engine and of the mixture supplied to the engine unless is has reached its proper operating temperature. The λ-sensor, or more precisely its internal resistance, is dependent on temperature. Thus, for example the internal resistance of a cold sensor may be several megohm so that any signal from it would not be usable for a control process.

However, this circumstance may be used to recognize the non-operational state of the sensor by feeding to the sensor a current of suitable and well defined magnitude thereby producing a voltage drop across the sensor which will normally be substantially larger than the threshold voltage and can be appropriately interpreted. For example, this high signal may be used to engage a controller for the secondary air supply by simulating the presence of a rich mixture which causes the secondary air controller to start the supply of secondary air. This air may be admitted to a catalyzer and cause the exhaust gases to be post-combusted. In such a case, the λ-sensor would be disposed behind the catalyzer and would measure the oxygen content of the post-combusted exhaust gases.

On the other hand, the output signal of the λ-sensor may also be used for mixture control, for example when combined with an electronically controlled fuel injection system. In that case, the output signal of a cold λ-sensor might be interpreted to correspond to the richest or the leanest desired fuel mixture. Generally speaking, it is most suitable if the fuel injection system operates at some average value of enrichment when the sensor is non-operational. It is desirable if the average adjustment is also present when the λ-sensor is inoperative for some other reason, for example due to malfunction, or if it is cooled off as a consequence of prolonged idling or overrunning operation and thus is brought back into the temperature region in which the high internal resistance would produce a signal that would cause the fuel injection system to attempt to lean out the fuel mixture to an increasing degree.

When the λ-sensor is reheated, its internal resistance decreases and hence so does the voltage drop due to the calibrated input current. As a consequence, beginning with a certain sensor temperature, this induced voltage drop will be smaller than the threshold value set within the control loop. Once the operational sensor temperature is reached, the threshold within the control loop is exceeded by the sensor signal only whenever the mixture is actually too rich, i.e., when the control process operates normally.

When the λ-sensor is supplied with a constant calibrated current even during normal operation, it causes a voltage drop which may fluctuate substantially during different operational states of the engine due to the resulting temperature changes. This variable voltage drop across the sensor then results in an additional shift of the characteristic curve of the sensor and as a consequence the control process is incapable of high precision. This phenomenon will be discussed in greater detail with respect to FIG. 1 below.

OBJECT AND SUMMARY OF THE INVENTION

It is a principal object of the invention to provide a process and an apparatus for improving the operation of a λ-sensor in such a way that the variations due to the voltage drop of a calibrated current are prevented.

In order to attain this object, the invention proceeds from the process and apparatus described above and provides that the λ-sensor is supplied with a measuring current of predetermined magnitude and that the voltage drop across the sensor is measured and that the closed loop control of the fuel injection system or of the supplementary air supply is shut off and that a simple forward adjustment is engaged until such time as the signal from the sensor reaches a minimum value. At that point, the feedback control system is re-engaged and the monitoring current to the sensor is shut off so that the sensor signal is not affected by the monitoring current during normal operation.

The invention thus makes it possible to monitor the status of the sensor until it is fully operational and also provides satisfactory operation of the entire system when the sensor is non-operational. Furthermore, after the sensor has attained its normal operational status, the sensor signal's own inherent signal is unaffected by calibrating current and may thus be used for a feedback control process unaffected by any apparatus or other factors which were required prior to the attainment of operational readiness of the sensor.

The apparatus for carrying out the process of the invention provides a circuit which generates the measuring current and which senses the voltage drop across the oxygen sensor and compares it with a reference value. When the circuit senses that the sensor signal is below the threshold, the calibrated current is shut off and the feedback control loop is released.

The invention will be better understood as well as further objects and advantages thereof become more apparent from the ensuing detailed description of an exemplary embodiment of the invention taken in conjunction with the drawing.

DESCRIPTION OF THE PREFERRED EMBODIMENTS

Figure 1:
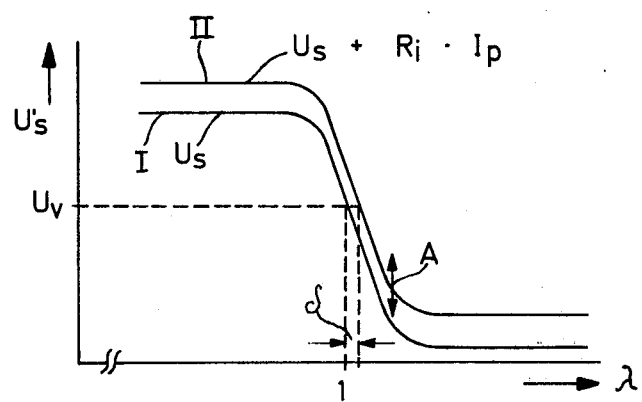
FIG. 1 is a diagram showing the sensor voltage $U_S$ as a function of the air factor $\lambda$ as a pure signal and as the sum of the internal EMF and the voltage drop due to the calibrating current.

Turning now to FIG. 1, there will be seen a diagram showing the sensor voltage as a function of the air factor. This diagram will be used to discuss the problems encountered when the oxygen sensor described above is used prior to and during its operational readiness. The curve I is the pure sensor EMF $U_S$ which is obtained in principle after the $\lambda$-sensor has reached operational temperature and which depends only on the air factor $\lambda$ except possibly for effects of aging which will not be discussed in this context but which may be compensated by adjusting the threshold value of a subsequent comparator.

The curve II is a sum of the inherent sensor EMF $U_S$ according to curve I and a voltage drop equal to the product of the variable internal resistance $R_i$ of the sensor and the calibrating current $I_p$ supplied by external circuitry. As suggested by the double arrow A in FIG. 1, this additional voltage fluctuates, so that the point, i.e., the air factor at which the sensor initiates a switchover from enrichment to leaning out is not constant but contains an error $\delta$. As a consequence, the control loop which is governed by the sensor is capable only of limited precision.

As already discussed, a principal object of the invention is to provide method and apparatus that eliminate this lack of precision and which furthermore insure that, when the system is switched from closed loop to open loop forward control, the elements of the control loop do not affect the desired average adjustment of the whole system. Such a switchover may be required when the sensor fails for any reason, for example due to a drop in temperature. Finally, the invention insures that the malfunction of the sensor during operation is definitely detected. This is important because the monitoring current which is fed to a non-operational sensor at the outset of the process is turned off once the sensor becomes operational so that, if the sensor is again cooled off and thus non-operational, the control system would not be capable of using the sensor as before. Inasmuch as the monitoring current would be lacking during such renewed failure, the whole system may be caused to malfunction.

Figure 2:
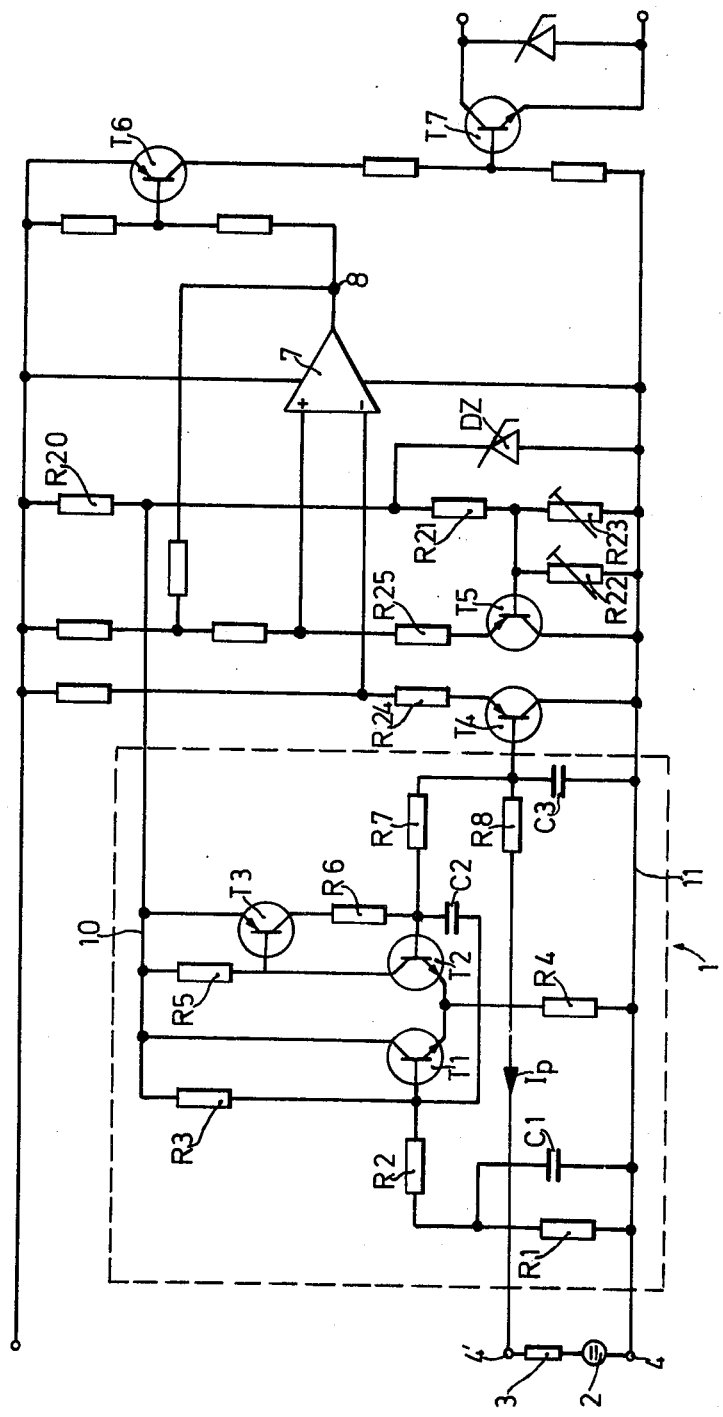
FIG. 2 is a circuit diagram of a first exemplary embodiment of the apparatus according to the invention.

Turning now to FIG. 2 there will be seen a circuit diagram of an apparatus for practicing the present invention. The preliminary discussion will relate to the portion of the circuit not contained within the dashed lines. This circuit includes a $\lambda$-sensor 2. Its internal resistance $R_i$ has been drawn separately and carries the references numeral 3. The output contact 4 of the sensor is grounded and the output contact 4' is connected through a resistor R8 to the base of a transistor T4 which cooperates with a transistor T5 and an operational amplifier 7 to constitute a threshold switch. The transistors T4 and T5 are both connected as so-called emitter followers and the transistor T5 receives a constant base bias via resistors R20, R21 and a Zener diode DZ. Two adjustable resistors R22 and R23 permit coarse and fine adjustment, respectively. The output signals of the transistors T4, T5 are fed to the subsequent operational amplifier 7 via resistors R24 and R25, respectively. The output of the threshold switch is substantially equal to the positive or negative supply potential depending on whether the input at the base of the transistor T4 is larger or smaller than the voltage supplied to the base of the transistor T5 corresponding to a set point value. Hence the output of the operational amplifier may be used for subsequent control or switching tasks. Such processing as will be needed may be supplied by transistors T6 and T7 which need not be discussed in greater detail.

It is a significant feature of the present invention that the input of the just described threshold switch includes further circuitry, in particular the circuit 1 within the dashed lines.

In the simplest case, the additional circuitry consists of a bridge circuit, one branch of which is formed by the $\lambda$-sensor 2 and its internal resistance 3 and another branch of which consists of the collector-emitter path of the transistor T3 and the resistor R6. The parallel branch may be simply the resistors R3 and R1. In the following description, some of the circuit elements will not be discussed so as to permit explanation of the simplest possible embodiment. The bridge diagonal contains the emitter-base path of a transistor T2 which in this simplified embodiment has its emitter connected to the junction of the resistors R3 and R1 and its base connected to the junction of the internal resistance 3 and the resistor R6. The collector of the transistor T2 is connected through a resistor R5 to a positive voltage supply line 10 and is also connected to the base of the transistor T3 lying in one of the branches of the bridge. In a manner further to be described below, this circuit can shut off the sensor current $I_p$. As illustrated in FIG. 2, one of the branches of the bridge may be complemented by a further resistor R2 in series with resistors R1 and R3 and a capacitor C1 in parallel with the resistor R1. The other branch, parallel to the branch consisting of resistors R1, R2 and R3, includes the $\lambda$-sensor 2 in series with its own internal resistance 3 and further in series with the resistor R8 that protects the transistor T4 and has a parallel capacitor C3. The junction of the resistor R8 and the capacitor C3 is further connected to a resistor R7 which lies in series with the resistor R6 and the collector-emitter path of the transistor T3. The monitoring system in the diagonal of the bridge is a differential amplifier formed by transistors T1 and T2. The emitters of the two transistors T1 and T2 are joined and are connected through a resistor R4 to the lower potential source, i.e., the minus line 11. The collector of the transistor T1 is connected directly to the positive line 10 and the bases of the transistors T1 and T2 are joined through a further capacitor C2.

The capacitor C3 and the resistor R8 together constitute a low pass filter which removes high frequency disturbances such as the sensor line may pick up from the threshold switch formed by the transistors T4 and T5. The capacitor C1 is inserted for symmetry of the bridge with respect to any disturbing alternating potentials.

The basic job of the capacitor C2 is to desensitize the differential amplifier as against interference potentials. It further insures that after the supply voltage has been turned on, the transistors T1 and T2 are initially conducting because their bases are for a short time connected to the same potential through the capacitor C2 which initially represents a short circuit.

The circuit operates in such a manner that the conducting transistor T2 causes initially conduction of transistor T3 and both branches of the bridge are subject to current flow.

The actual internal resistance 3 of the λ-sensor determines whether the transistor T1 or the transistor T2 are to remain conducting. If the λ-sensor is not yet operational, i.e., it is cold and thus its internal resistance high, the base of T2 will receive via the conducting transistor T3 a high positive voltage thereby insuring that the transistor T2 as well as the transistor T3 remain conducting. An appropriate choice of values of the resistors R1, R2 and R3 is made so that the transistor T1 will then be blocked. The conducting transistor T3 passes a current $I_p$ through the resistors R6, R7 and R8 which produces a voltage drop at the very high internal resistance 3 of the sensor that exceeds the threshold of the subsequent threshold switch T4, T5 and which causes, for example, the secondary air valve to remain engaged or, by retaining the output of the operational amplifier 7 at a fixed potential, it causes the mixture controller of the fuel injection system to retain open loop control and to adapt itself to an average fuel mixture. In any case, the circuitry which follows the operational amplifier 7 recognizes the fixed output potential from the operational amplifier 7 and thus recognizes that the sensor is not yet operational. The circuitry then takes the necessary steps to maintain satisfactory and orderly engine operation without having actual information regarding the exhaust gas composition.

As the engine operates, the λ-sensor is eventually warmed up by the hot exhaust gases and its internal resistance drops, thereby also dropping the base voltage at the transistor T2. Once the internal resistance 3 has reached a certain value which is determined by the dimensions of the remaining bridge resistors, the base voltage of the transistor T2 goes lower than that of the transistor T1, thereby blocking the transistor T2 and hence also the transistor T3. Thus at the same time the current flowing through this branch of the bridge is interrupted. As a consequence, the current $I_p$ flowing through the sensor is also interrupted and the entire control system behind the sensor 2,3, is permitted to operate normally and the only current flowing through the sensor will now be the very small input current to the threshold switch, equal to the base current of the transistor T4.

A control system of this type must be capable of satisfactory operation even when the engine is used under extreme conditions which may result in a temporary cooling off of the sensor and a subsequent lack of the normal sensor signal. However, there may be other reasons for malfunction, for example a broken sensor connection, etc. In order to permit continued operation of the controller under the circumstances it is desirable to continuously monitor the operational readiness of the sensor in order to prevent that abnormal conditions affect the control loop. The circuitry illustrated in FIG. 3 includes in the top portion of the figure the control loop previously described in FIG. 2, namely the λ-sensor 2,3, the threshold switch with transistors T4, T5 and the operational amplifier 7. In this exemplary embodiment, there is provided a further operational amplifier 15 operating as an integrator and delivering at its output 16 a signal which may be used as a final control signal for other parts of the fuel injection system, which will not be discussed in the present context, which modify the duration of the fuel injection control pulses fed to the engine fuel valves. The lower part of the FIG. 3 again includes the bridge circuit in somewhat simplified form. The bridge circuit 1 is complemented by a further transistor T3 which has circuit elements combining into a monostable flip-flop, a so-called economy mono flip-flop, that is triggered by any available signal, for example by the fuel injection pulses. The mono flip-flop is formed by connecting the emitter of the transistor T8 to ground and to connect its collector through a resistor R10 to the positive supply line, preferably stabilized. The base of the transistor T8 has a series resistor R11 and a diode D3 connected as shown and the base is connected via resistor R12 to the minus line 11. The junction of the resistor R11 and the diode D3 is connected to a capacitor C4 which receives the arbitrary pulse train triggering the monostable multivibrator.

Under normal conditions, the transistor T8 conducts, so that the diode D2 is blocked. Its cathode is connected to the junction of the resistor R6 and a diode D1 connected between the collector of the transistor T3 and the resistor R6. The economy mono flip-flop is thus entirely decoupled from the remaining circuit. Once the mono flip-flop is triggered via the capacitor C4, a negative voltage pulse blocks the diode D3 until the negative charge on the capacitor has decayed via the resistor R11. During this time, which is very short compared to the normal period of the alternating sensor potential $U_S$, the transistor T8 is blocked so that during that time, the monitoring sensor current $I_p$ flows into the sensor 2 through the diode D2 and the resistor R6. After this very short time, the flip-flop returns to its normal state. If however the λ-sensor 2 is cold, i.e., has a high internal resistance during the non-conduction of the transistor T8, or if its connecting lines were broken, the voltage at the base of the transistor T2 rises beyond the voltage present at the base of the transistor T1 determined by the resistors R1 and R3 so that the transistors T2 and T3 again become conducting and maintain the current flow through the λ-sensor 2 even after the monostable flip-flop returns to its normal state in which the transistor T8 conducts.

Thus the sensor status may be monitored periodically for short periods of time and when the sensor exhibits a high internal resistance, the closed loop control may be entirely shut off because, when the calibrating current $I_p$ flows through the sensor, the output of the operational amplifier 7 again retains one or the other of its maximum output voltages. The occurrence of a constant voltage at the output of the operational amplifier 7 is used by a subsequent control circuit for shutting of closed loop feedback control and for switching over to an average type of adjustment. Another manner of changing the operation of the control loop and to react precisely to the operational states of the sensor is given by providing a line from the collector of the conducting transistor T3 to the base of a subsequent transistor T9 causing the latter to conduct. The base of the transistor T9 is coupled to the resistors R13, R14 so that when the transistor T9 conducts, the diodes D4 and D5 coupled to its collector pull the outputs of the operational amplifiers 7 and 15 to the negative potential.

It has already been mentioned that the transistors T3 and T2 maintain each other in the state of conduction until the internal resistance 3 of the sensor goes so low that the base of the transistor T2 is more negative than that of the transistor T1. Once that happens, the transistor T2 cannot be rendered conducting through the resistor R10 even when the transistor T8 is blocked.

The purpose of the diode D1 between the collector of the transistor T3 and the resistor R6 is to prevent conduction of the transistor T9 while the transistor T8 is periodically blocked unless there is an actual reason for such conduction, i.e., that the internal resistance 3 of the λ-sensor is sufficiently high.

The periodic cycling of the current passing through the λ-sensor permits a continuous monitoring of the operation of the entire system, i.e., to check whether the internal resistance of the sensor has increased beyond normal limits. In such a case, the feedback control process is turned off and the calibration current $I_p$ is maintained through the λ-sensor until the signal from the sensor gives an indication that a renewed switchover to closed loop control is indicated.

Figure 3:
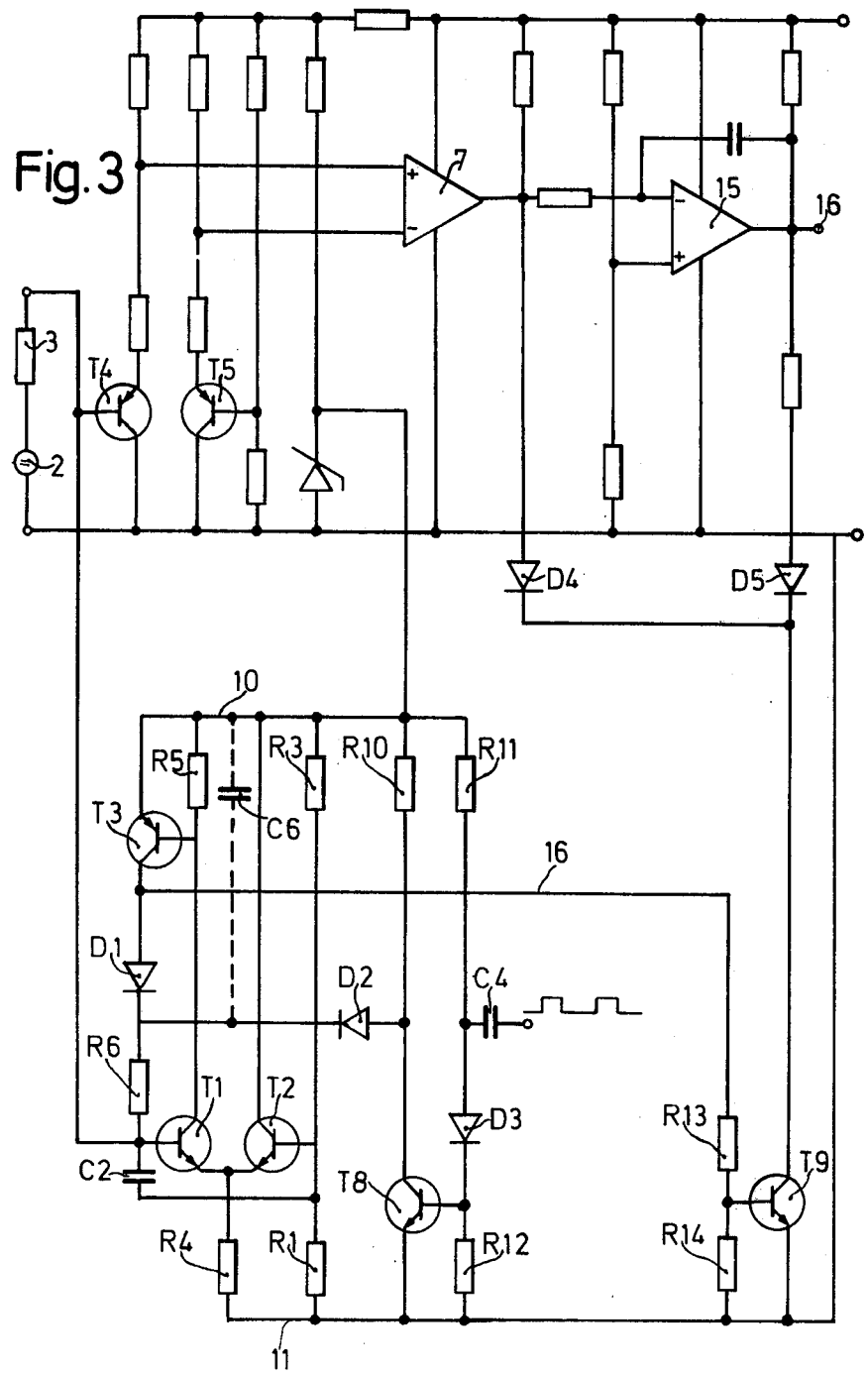
FIG. 3 is a variant of the circuit of FIG. 2 for the cyclic inspection of the operational readiness of the sensor.

During the occurrence of the test pulses, the threshold switch consisting of transistors T4 and T5 is repeatedly brought into a condition which corresponds to a sensor potential lying above the threshold value. For this reason, the test pulses must be substantially shorter than the period of occurrence so that the control process will not be disturbed. This condition is attained by appropriate design of the monostable multivibrator which triggers the differential amplifier made up of the transistors T1, T2. The circuit which controls the behavior of the system depending on the sensor status must be able to detect the correct sensor status when the supply voltage is first turned on. Thus, the bridge circuit and its associated differential amplifier should be so constructed that the combination of transistors T1, T3 is initially conducting. This may be done by appropriate sizing of the bridge resistors. Preferably, it may be done by connecting a switch-on pulse of the appropriate algebraic sign to the base of the transistor T2 when the supply voltage is first turned on. For example, the base of the transistor T2 may be connected through a capacitor C6 to the positive supply line. In FIG. 3 this possibility is shown by a dashed line connection of the plus line 10 through a capacitor C6 to the junction of the resistor R6 and the diode D1. Thus, when the circuit is first turned on, the capacitor C6 represents a momentary short circuit and supplies a sufficiently large positive current to the base of the transistor T2 to cause it to conduct temporarily, thus holding the transistor T3 in conduction if the sensor status permits it, i.e., if the internal resistance of the sensor is sufficiently high.

The foregoing relates to preferred exemplary embodiments of the invention, it being understood that other embodiments and variants thereof are possible within the spirit and scope of the invention.

What is claimed is:

1. A method for turning on and/or off a regulatory means operating with an oxygen sensor which is part of a control loop and which detects a given operational state (actual value) during the mixture preparation for motor vehicles, whereby the sensor requires a period of time which is indeterminable before reaching its operating temperature and full function during the operation of a fuel injection apparatus in which the sensor is disposed in the exhaust gas channel and influences the function of the injection apparatus, which includes one of either the duration of the injection pulses generated the secondary air supply on the exhaust side, the improvement comprising the steps of:
   passing a test current through said sensor;
   detecting the voltage drop across said sensor due to the passage of said test current;
   comparing said voltage drop with a predetermined set-point value;
   opening the control loop when said comparison shows that the internal resistance of said sensor is too high; and
   closing the control loop and cutting off said test current when said comparison shows that the internal resistance of said sensor is sufficiently low to provide an adequate control signal to said control loop; whereby said test current is prevented from falsifying the control signal from said sensor in normal operation.

2. A method as defined by claim 1, comprising the further steps of supplying periodic short test current pulses to said sensor during normal operation thereof; and
   placing said control loop in a forward control status and re-supplying said test current when the internal resistance of said sensor rises above predetermined limits during the operation thereof.

3. In an apparatus for turning on and/or off a regulatory means operating with an oxygen sensor which is part of a control loop and which detects a given operational state (actual value) during the mixture preparation for motor vehicles, whereby the sensor requires a period of time which is indeterminable before reaching its operating temperature and full function during the operation of a fuel injection apparatus in which the sensor is disposed in the exhaust gas channel and influences the function of the injection apparatus, which includes one of either the duration of the injection pulses generated or the secondary air supply on the exhaust side, the improvement comprising:
   a test circuit for generating a test current to be supplied to said sensor;
   comparator means for detecting the relative magnitude of the voltage drop across said sensor due to the passage of said test current;
   whereby, when said comparator means indicates that the internal resistance of said sensor is lower than a predetermined limit, said test current is cut off and normal control loop operation is initiated.

4. An apparatus as defined by claim 3, wherein said test circuit includes a bridge circuit, one branch of which includes said sensor which is the oxygen sensor of an internal combustion engine and further includes a switching transistor (T3) which is controlled by a transistor (T2) connected across the diagonal of said bridge circuit, and switching transistor (T3) carrying said test current when conducting.

5. An apparatus as defined by claim 4, wherein said one branch of said bridge circuit includes the series connection of the collector emitter path of said switching transistor (T3) and further resistors (R6, R7, R8) as well as the internal resistance (3) of said λ-sensor and wherein the second branch of said bridge circuit includes the series connection of resistors (R1, R2, R3).

6. An apparatus as defined by claim 5, wherein said bridge circuit includes a differential amplifier consisting of two transistors (T1, T2), the emitters of which are joined and connected through a resistor (R4) to a source of potential and wherein the base of said switching transistor (T3) is connected to the collector of said transistor (T2) which responds to the potential difference across the diagonal of said bridge circuit.

7. An apparatus as defined by claim 6, wherein the inputs to said differential amplifier of said bridge circuit are joined via a capacitor (C2).

8. An apparatus as defined by claim 3, further comprising a threshold switch for receiving the signal from said sensor and including two transistors (T4, T5) respectively connected to the inputs of an operational amplifier (7).

9. An apparatus as defined by claim 8, further comprising an interference preventing capacitor (C3) connected in parallel with said sensor to said threshold switch and further comprising a bridge circuit, one branch of which includes said sensor which is the oxygen sensor of an internal combustion engine and further includes a switching transistor (T3) which is controlled by a transistor (T2) connected across the diagonal of said bridge circuit, said switching transistor (T3) carrying said test current when conducting, said bridge including a second branch composed of series resistors and a capacitor connected in parallel with one of said series resistors, and wherein all resistors are so dimensioned that when the supply voltage is initially turned on, said switching transistor (T3) is initially rendered conducting.

10. An apparatus as defined by claim 3, further comprising a pulse generating circuit for generating short periodic current pulses to said λ-sensor.

11. An apparatus as defined by claim 10, wherein said circuit for generating short periodic pulses includes a monostable multivibrator consisting of a transistor (T8), the base of which is accessible via a capacitor and a diode and the collector of which is connected through a further diode to said λ-sensor; whereby a positive current pulse may be delivered periodically to said λ-sensor.

12. An apparatus as defined by claim 11, wherein said monostable multivibrator receives its control pulses from within said apparatus.

13. An apparatus as defined by claim 3, wherein said test circuit includes a bridge circuit, one branch of which includes said sensor which is the oxygen sensor of an internal combustion engine and further includes a switching transistor (T3) which is controlled by a transistor (T2) connected across the diagonal of said bridge circuit, said switching transistor (T3) carrying said test current when conducting, and wherein the base of said transistor (T2) is connected via a capacitor (C6) to one of the voltage supply lines of said apparatus; whereby when the supply voltage is first turned on and said λ-sensor exhibits high internal resistance, said transistor (T2) is in the conducting state.

14. An apparatus as defined by claim 13, further comprising circuit means connected to the collector of said switching transistor (T3) for programmed evaluation of the status of said λ-sensor and further comprising a diode connected to the collector of said switching transistor (T3) for protection against positive current pulses.

* * * * *